United States Patent
de Andrade Filho et al.

(10) Patent No.: US 10,060,328 B2
(45) Date of Patent: Aug. 28, 2018

(54) TEMPERATURE CONTROL APPARATUS AND METHOD FOR AN AUTOMOTIVE COOLING SYSTEM

(71) Applicant: Melling Tool Co., Jackson, MI (US)

(72) Inventors: Ayres Pinto de Andrade Filho, Jackson, MI (US); João Luiz de Carvalho Meira, Santo Andrew (BR); Paulo Bressan, Maua (BR); Rodrigo Barbosa Bronzeri, Osasco (BR)

(73) Assignee: Melling Tool Company, Jackson, MI (US)

( * ) Notice: Subject to any disclaimer, the term of this patent is extended or adjusted under 35 U.S.C. 154(b) by 124 days.

(21) Appl. No.: 14/914,735

(22) PCT Filed: Aug. 27, 2013

(86) PCT No.: PCT/US2013/056758
§ 371 (c)(1),
(2) Date: Feb. 26, 2016

(87) PCT Pub. No.: WO2015/030724
PCT Pub. Date: Mar. 5, 2015

(65) Prior Publication Data
US 2016/0208676 A1    Jul. 21, 2016

(51) Int. Cl.
*F01P 7/14*    (2006.01)
*F01P 7/16*    (2006.01)
(Continued)

(52) U.S. Cl.
CPC ............... *F01P 7/14* (2013.01); *F01P 7/16* (2013.01); *F16K 31/402* (2013.01);
(Continued)

(58) Field of Classification Search
CPC ...... F01P 7/14; F01P 7/16; F01P 7/167; F01P 2025/32; F16K 7/17; F16K 31/1266; F16K 31/1262
See application file for complete search history.

(56) References Cited

U.S. PATENT DOCUMENTS

| | | | | |
|---|---|---|---|---|
| 3,859,619 A | * | 1/1975 | Ishihara | F16K 37/0033 137/554 |
| 4,790,937 A | * | 12/1988 | Eilers | A61M 1/16 210/321.71 |

(Continued)

FOREIGN PATENT DOCUMENTS

| | | |
|---|---|---|
| CN | 1470787 A | 1/2004 |
| DE | 3435833 A1 | 4/1986 |

(Continued)

*Primary Examiner* — Kun Kai Ma
(74) *Attorney, Agent, or Firm* — Young Basile Hanlon & MacFarlane, P.C.

(57) ABSTRACT

A system for regulating a flow of liquid coolant in an automotive cooling system includes a valve body having an inlet and an outlet. A pressure operated valve member moves in response to a fluid pressure. An electrically operated valve member regulates the fluid pressure within the chamber. A sensor target is coupled to the pressure operated valve member. A position sensor is located outside of the valve body and outputs a position signal based on proximity of the sensor target. An electronic control unit calculates a target coolant flow rate based in part on a calculated target temperature for the engine and a temperature signal from a temperature sensor, determines a target position for the pressure operated valve member based on the target coolant flow rate, and controls operation of the electrically operated valve member based on the target position and the position signal.

13 Claims, 6 Drawing Sheets

(51) Int. Cl.
  *F16K 31/40* (2006.01)
  *F16K 37/00* (2006.01)
  *F16K 31/126* (2006.01)
  *F16K 7/17* (2006.01)

(52) U.S. Cl.
  CPC .......... *F16K 37/0033* (2013.01); *F01P 7/167* (2013.01); *F01P 2007/146* (2013.01); *F01P 2025/30* (2013.01); *F01P 2025/32* (2013.01); *F01P 2070/10* (2013.01); *F16K 7/17* (2013.01); *F16K 31/1262* (2013.01); *F16K 31/1266* (2013.01)

(56) References Cited

U.S. PATENT DOCUMENTS

| | | | |
|---|---|---|---|
| 4,966,528 A | 10/1990 | Henkel et al. | |
| 5,249,932 A * | 10/1993 | Van Bork | F04B 43/0081 |
| | | | 417/385 |
| 5,458,096 A | 10/1995 | Hollis | |
| 5,899,434 A * | 5/1999 | Nishimura | F16K 31/402 |
| | | | 251/30.02 |
| 6,182,941 B1 | 2/2001 | Scheurenbrand et al. | |
| 6,244,561 B1 * | 6/2001 | Hansen, III | F16K 31/42 |
| | | | 251/121 |
| 6,554,578 B1 * | 4/2003 | Siegel | F04B 43/0081 |
| | | | 417/383 |
| 6,749,173 B2 * | 6/2004 | Heiling | F16K 31/385 |
| | | | 251/30.01 |
| 6,761,063 B2 | 7/2004 | Mengle | |
| 6,889,706 B2 * | 5/2005 | Fukano | G05D 7/005 |
| | | | 137/487.5 |
| 7,380,568 B2 * | 6/2008 | Tiwet | G05D 7/005 |
| | | | 137/205 |
| 8,261,770 B2 | 9/2012 | Bush | |
| 2003/0234051 A1 * | 12/2003 | Toivonen | F16K 31/084 |
| | | | 137/554 |
| 2006/0065324 A1 * | 3/2006 | Ferreira | F02M 25/0836 |
| | | | 141/200 |
| 2006/0207654 A1 * | 9/2006 | Huang | G05D 7/0635 |
| | | | 137/66 |
| 2007/0040454 A1 * | 2/2007 | Freudenberger | F04B 17/042 |
| | | | 310/12.04 |
| 2008/0040923 A1 * | 2/2008 | Filho | B29C 45/14311 |
| | | | 29/888.02 |
| 2010/0006044 A1 | 1/2010 | Duley | |
| 2010/0043896 A1 * | 2/2010 | Shock | F17D 5/02 |
| | | | 137/613 |
| 2011/0100619 A1 * | 5/2011 | De Andrade Filho | F16K 31/402 |
| | | | 165/287 |
| 2013/0008542 A1 | 1/2013 | Irwin et al. | |
| 2013/0340428 A1 * | 12/2013 | Graichen | F02M 25/0709 |
| | | | 60/605.2 |

FOREIGN PATENT DOCUMENTS

| | | |
|---|---|---|
| DE | 102007042866 A1 | 3/2009 |
| EP | 0890717 A2 | 1/1999 |
| EP | 1045120 A1 | 10/2000 |
| JP | S6132876 U | 2/1986 |
| JP | H102161183 A | 6/1990 |
| JP | H106511532 A | 12/1994 |
| JP | 2001527612 A | 12/2001 |
| WO | 2009153612 A1 | 12/2009 |
| WO | 2011086154 | 7/2011 |

* cited by examiner

TEMPERATURE CONTROL APPARATUS AND METHOD FOR AN AUTOMOTIVE COOLING SYSTEM

TECHNICAL FIELD

The disclosure herein relates to the field of fluid flow control valves, and in particular, a temperature control valve and method for controlling the flow of liquid coolant in an automotive cooling system.

BACKGROUND

It is known to use a fluid flow control valve in an automotive cooling system to regulate the flow of coolant and thereby regulate the operating temperature of the engine of the automobile.

One class of conventional fluid flow control valves for automotive cooling systems employs a wax element that is sensitive to coolant temperature to regulate the opening and closing of the fluid flow control valve thereby regulating the flow of coolant through the automotive cooling system. However, due to the nature of the wax element, this type of system is slow to respond to changes in the temperature of the engine. Furthermore, since the opening and closing of the valve is controlled by the thermal properties of the wax used in the valve, the operating temperature range in which the engine is controlled cannot be easily adjusted.

Another type of fluid flow control valve for an automotive cooling system provides a desired rate of coolant flow using an electrically-operated valve that is driven to a desired position, for example, by a stepper motor.

Another type of fluid control establishes and blocks fluid flow using a pressure-operated diaphragm valve that moves in response to pressure in a control chamber. The pressure in the control chamber is regulated by an electrically operated valve that is much smaller in size as compared to the diaphragm valve. In these valves, the pressure-operated diaphragm valve moves between fully open and fully closed positions is correspondence with opening and closing of the electrically operated valve.

SUMMARY

One aspect of the disclosed embodiments is a system for regulating a flow of liquid coolant in an automotive cooling system. The system includes a valve body having an inlet and an outlet. A pressure operated valve member is moveable within the valve body to regulate a flow of the liquid coolant from the inlet to the outlet. A chamber is adjacent to the pressure operated valve member. The pressure operated valve member moves in response to a fluid pressure within the chamber. A sensor target is disposed within the valve body and is coupled to the pressure operated valve member for movement therewith. A position sensor is located outside of the valve body and outputs a position signal based on proximity of the sensor target to the sensor.

Another aspect of the disclosed embodiments is a system for regulating a flow of a liquid coolant in an automotive cooling system. The system includes a valve body having an inlet and an outlet. A pressure operated valve member moves within the valve body in response to a fluid pressure within a chamber adjacent to the pressure operated valve member to regulate a flow rate of the liquid coolant from the inlet to the outlet. An electrically operated valve member is configured to regulate the fluid pressure within the chamber to thereby cause movement of the pressure operated valve member. A sensor target is disposed within the valve body and is coupled to the pressure operated valve member for movement therewith. A position sensor is located outside of the valve body and outputs a position signal based on proximity of the sensor target to the position sensor. A temperature sensor outputs a temperature signal. An electronic control unit calculates a target temperature for the engine, calculates a target coolant flow rate based in part on the target temperature for the engine and the temperature signal, determines a target position for the pressure operated valve member based on the target coolant flow rate, and controls operation of the electrically operated valve member based on the target position for the pressure operated valve member and the position signal from the position sensor.

BRIEF DESCRIPTION OF THE DRAWINGS

The description herein makes reference to the accompanying drawings, wherein like-referenced numerals refer to like parts throughout several views and wherein.

DETAILED DESCRIPTION

In valves where a pressure operated valve is moved between open and closed positions based on the pressure within a chamber where the pressure within the chamber is regulated by a second valve, the pressure operated valve moves either to the fully open position or the fully closed position without the ability to exercise proportional control over the position of the pressure operated valve in order to set the pressure operated valve at an intermediate position between the fully opened position and the fully closed position. The disclosure herein teaches a temperature control valve where a pressure operated valve member is set at an intermediate position between the fully open position and the fully closed position by regulating the pressure in the chamber while monitoring the position of the pressure operated valve member. As will be explained herein, the position of the temperature control valve can be monitored by connecting a sensor target to the pressure operated valve member such that it moves along with the pressure operated valve member. A sensor tracks the position of the sensor target and outputs a position signal representing the position of the pressure operated valve member. The position signal can then be utilized to regulate the pressure within the chamber, thus allowing the pressure operated valve member to be maintained at an intermediate position.

Figure 1:
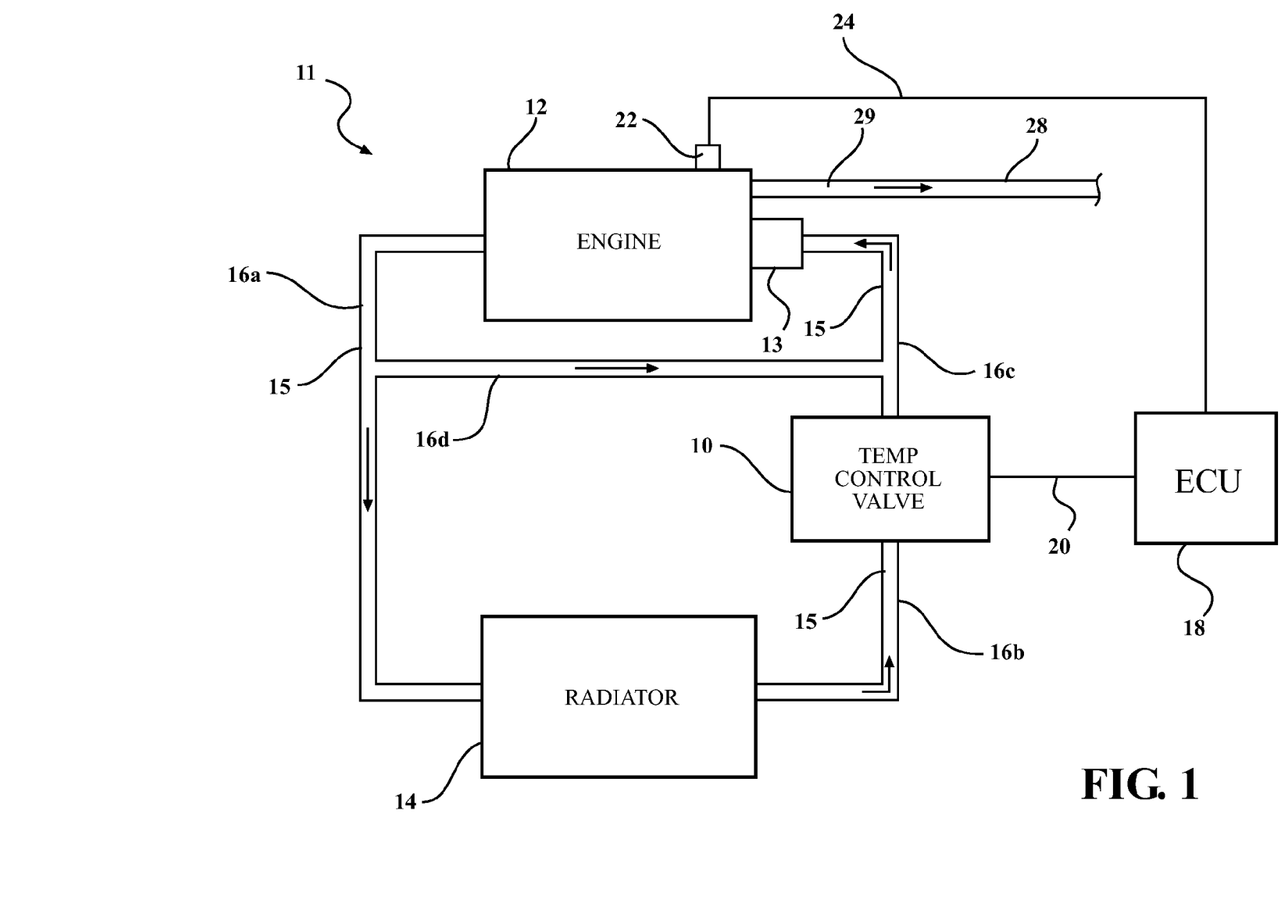
FIG. 1 is a block diagram showing an automotive cooling system that includes a temperature control valve.

FIG. 1 shows an automotive cooling system 11 that includes a temperature control valve 10. The automotive cooling system 11 also includes an engine 12, such as an internal combustion engine, and a radiator 14. The temperature control valve 10 regulates the temperature of the engine 12 by regulating the flow of a liquid coolant 15 between the engine 12 and the radiator 14 in a cooling circuit that is pressurized by a pump 13.

In the illustrated example, the engine 12 is connected to the radiator 14 by a return line 16a that transmits used liquid coolant 15 to the radiator 14. Once the radiator 14 has cooled the liquid coolant 15, the liquid coolant is discharged from the radiator 14 into a first supply line 16b, where the liquid coolant is directed to the temperature control valve 10. The temperature control valve 10 is further connected to the pump 13 and the engine 12 by a second supply line 16c. Thus, the temperature control valve 10 can regulate the temperature of the engine 12 by changing a flow rate of the liquid coolant 15. The rate of flow of the liquid coolant 15 is changed by moving between a closed position, wherein the liquid coolant 15 is not provided from the radiator 14 to the engine 12, and an open position, wherein the liquid coolant 15 is provided to the engine 12 from the radiator. When the temperature control valve 10 is in the closed position, the liquid coolant 15 is re-circulated to the engine 12 through a recirculation line 16d that is connected to the return line 16a downstream of the engine 12 and is connected to the second supply line 16c downstream of the temperature control valve 10. As will be explained herein, the temperature control valve 10 can also establish an intermediate position in which the liquid coolant 15 is provided from the radiator to the engine at a flow rate that is less than the flow rate at which the liquid coolant is provided when the temperature control valve is in the fully open position.

To control the operation of the temperature control valve 10, the automotive cooling system 11 includes an electronic control unit (ECU) 18. The ECU 18 may be implemented by, for example, a microcomputer including a random access memory (RAM), a read-only memory (ROM), and a central processing unit (CPU), in addition to various input and output connections. Generally, the control functions described herein are performed by execution of the CPU of one or more software programs stored in ROM. Of course, some or all of the parts and their associated functions can be implemented by hardware components.

The ECU 18 is electrically connected to the temperature control valve 10 by a communication line 20 over which the ECU 18 transmits signals to the temperature control valve 10 that cause the temperature control valve 10 to move between the open and closed positions. To regulate the temperature of the engine 12 within a desired temperature range, a temperature sensor 22 is provided in thermal communication with the engine 12 and in electrical communication with the ECU 18 by a communication line 24. The temperature sensor 22 transmits signals to the ECU 18 over the communication line 24 corresponding to the temperature of the engine 12. These signals may be referred to herein as a temperature signal. The ECU 18 then transmits signals to the temperature control valve 10, based on the temperature sensed by the temperature sensor 22, to maintain the engine 12 in the predetermined temperature range. Although the temperature sensor 22 is described as directly measuring the temperature of the engine 12 by thermal communication of the temperature sensor 22 with the engine 12, it should be understood that this need not be the case. Rather, the temperature sensor 22 may measure any thermal property associated with the engine 12 that corresponds to the temperature of the engine 12. By way of example, the temperature sensor 22 could be in thermal communication with the liquid coolant 15 in the return line 16a to indirectly measure the temperature of the engine 12 by measuring the temperature of the liquid coolant 15 in the return line 16a.

Figure 2:
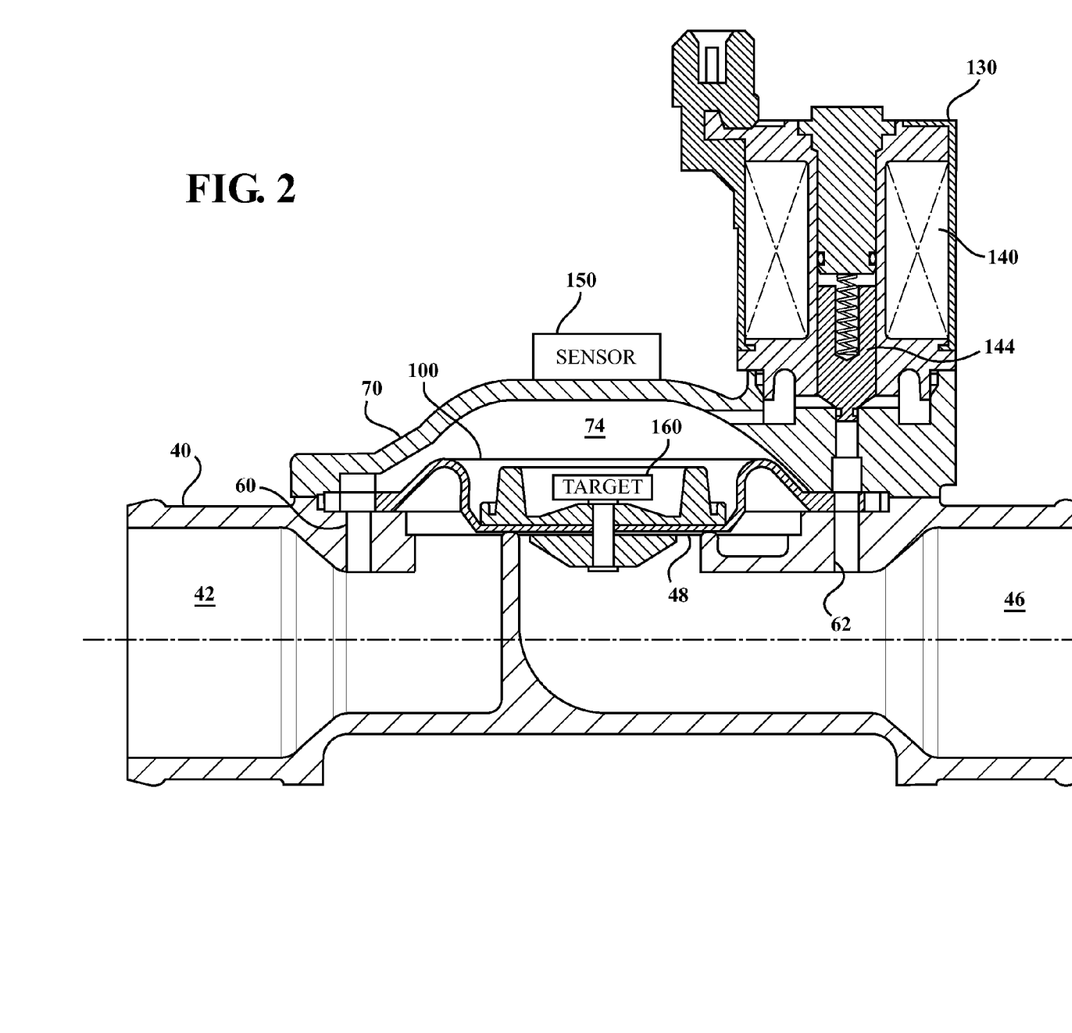
FIG. 2 is a sectional view showing the temperature control valve in a closed position.
Figure 3:
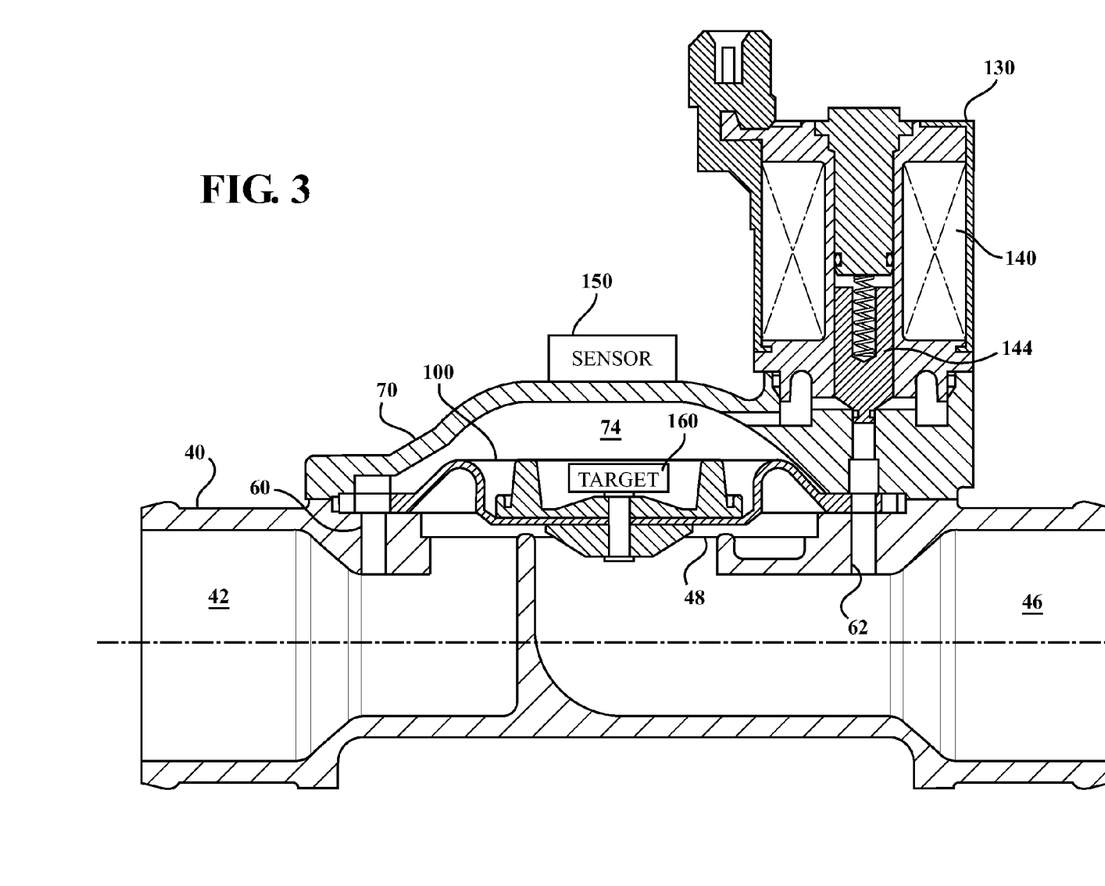
FIG. 3 is a sectional view showing the temperature control valve in an open position.

As shown in FIGS. 2-3, the temperature control valve 10 includes a valve body 40, a cover 70, a first valve assembly or pressure operated valve member 100, and a second valve assembly or electrically operated valve member 130. The valve body 40 includes an inlet 42 and an outlet 46 for connecting the valve body 40 to the first supply line 16b and the second supply line 16c of the automotive cooling system 11, respectively.

The closed position and the open position of the temperature control valve 10 correspond to a closed position and an open position of the pressure operated valve member 100. The pressure operated valve member 100 moves between the closed position (shown in FIG. 2), wherein the pressure operated valve member 100 engages a valve seat 48 of the valve body 40 to disrupt fluid communication such that the inlet 42 of the valve body 40 is not in fluid communication with the outlet 46 of the valve body 40, and the open position (shown in FIG. 3), wherein the pressure operated valve member 100 disengages the valve seat to establish fluid communication such that the inlet 42 of the valve body 40 is in fluid communication with the outlet 46 of the valve body 40.

When the pressure operated valve member 100 is in the open position, a first flow path is defined between the inlet 42 of the valve body 40 and the outlet 46 of the valve body 40. The first flow path is the primary flow path through the temperature control valve 10, and the flow of the liquid coolant 15 along the first flow path operates to supply the liquid coolant 15 to the engine 12 by way of the second supply line 16c to regulate the temperature of the engine 12. The first flow path is also defined between the inlet 42 of the valve body 40 and the outlet 46 of the valve body 40 when the pressure operated valve member 100 is in the intermediate position between the fully open position and the fully closed position, and the liquid coolant is thus allowed to flow along the first flow path when the pressure operated valve member 100 is in the intermediate position, albeit at a reduced flow rate relative to the flow rate that is established when the pressure operated valve member 100 is in the fully open position. Although the intermediate position may be described herein as a single position, it should be understood that the intermediate position can be defined at any point between the fully open position and the fully closed position, and that the pressure operated valve member can be controlled over a range of intermediate positions between the fully open and fully closed positions.

The pressure operated valve member 100 moves within the valve body 40 between the closed position and the open position in response to fluid pressure acting upon the pressure operated valve member 100. More particularly, the cover 70 is sealingly connected to the valve body 40, and the pressure operated valve member 100 is captured between the valve body 40 and the cover 70, forming a chamber 74 adjacent to the pressure operated valve member 100. By regulating the fluid pressure within the chamber 74, the pressure operated valve member 100 may be moved between the closed position and the open position.

In order to regulate pressure within the chamber 74, the temperature control valve 10 is operable to selectively permit fluid communication between the inlet 42 and the outlet 46 through the chamber 74 using the electrically operated valve member 130. As will be explained in detail herein, the chamber 74 is in fluid communication with the inlet 42 of the valve body 40 through a first flow port 60 formed in the valve body 40 and is in fluid communication with the outlet 46 of the valve body 40 through a second flow port 62 formed in the valve body 40. Thus, the electrically operated valve member 130 is movable between a closed position (shown in FIG. 2), wherein the chamber 74 is not in fluid communication with the outlet 46 of the valve body 40 through the second flow port 62, and an open position (shown in FIG. 3), wherein the chamber 74 is in fluid communication with the outlet 46 of the valve body 40 through the second flow port 62 of the valve body 40. When the electrically operated valve member 130 is in the open position, the first flow port 60 in the valve body 40, the chamber 74, and the second flow port 62 in the valve body 40 cooperate to define a second flow path between the inlet 42 and the outlet 46 of the valve body 40. The second flow path operates to regulate fluid pressure within the chamber 74 and does not, by itself, supply the liquid coolant to the engine 12 in quantities sufficient to regulate the temperature of the engine 12.

In the illustrated example, the electrically operated valve member 130 is an electrically operated solenoid valve that includes a coil 140 and an armature 144. The armature 144 moves in response to energization of the coil 140. The armature 144 can be biased, such as by a spring, toward either of the open position or the closed position thereof, and is biased toward the closed position in the illustrated example. In the illustrated example, the electrically operated valve member 130 is a non-proportional valve that is moveable between a fully open position and a fully closed position along the second flow path to maintain a selective fluid pressure in the chamber 74. A non-proportional valve of this type can be used to regulate the pressure within the chamber 74 by opening and closing the valve to raise or lower the pressure as needed.

In other examples, the electrically operated valve member 130 can be a proportional valve that is moveable to one or more intermediate positions between the fully open position and the fully closed position along the second flow path to maintain a selected fluid pressure in the chamber 74. Such a valve can be used to regulate the pressure in the chamber 74 by adjusting the position of the valve and thus the degree of restriction that the valve imposes along the second flow path without the need for cycling the valve between fully opened and fully closed positions.

The ECU 18 is configured to regulate the position of the pressure operated valve member 100 based on a position signal that the ECU 18 receives from a position sensor 150. For example, the position signal can be received at the ECU 18 from the position sensor 150 via the communication line 20.

The position sensor 150 is located outside of the valve body 40 such that the position sensor 150 need not be in contact with the liquid coolant 15. For example, the position sensor 150 can be connected to the cover 70. The connection between the position sensor 150 and the cover 70 can be a rigid connection, such as by a mechanical fastener of any suitable type. Alternatively, the position sensor 150 can be fixed to any part of the valve body 40 on the exterior thereof.

The position sensor 150 outputs a position signal that is based on the proximity of a sensor target 160 to the position sensor 150. The sensor target 160 is disposed within the valve body 40, such as within the chamber 74. The sensor target 160 is coupled to the pressure operated valve member 100 for movement therewith. Accordingly, as the pressure operated valve member 100 moves within the chamber 74 in response to changes in the fluid pressure within the chamber 74, the sensor target 160 moves along with the pressure operated valve member 100. Thus, the position signal output by the position sensor 150 changes as the pressure operated valve member 100 moves, and the position signal is thus related to the position of the pressure operated valve member 100 with respect to the valve seat 48 of the valve body 40.

The position sensor 150 and the sensor target 160 can be selected from various suitable types of sensors and sensor targets that allow detection of proximity. In the illustrated example, the sensor target 160 is a magnet, and the position sensor 150 is a hall effect sensor. Other types of sensors can be utilized. As an example, the sensor target 160 could be a metallic object, and the position sensor 150 could be an inductor, along with circuitry, adapted to measure inductance through the inductor.

The position signal that is output by the position sensor 150 can be in any suitable form that can be transmitted to the ECU 18. As an example, the position signal can be a varying voltage. The position signal varies in relation to a distance S between the position sensor 150 and the sensor target 160. Because the distance between the position sensor 150 and the valve seat 48 is fixed, the position signal therefore also changes in correspondence to a distance D between the pressure operated valve member 100 and the valve seat 48. The relationship between these distances is illustrated in FIGS. 4A-4C.

Figure 4A:
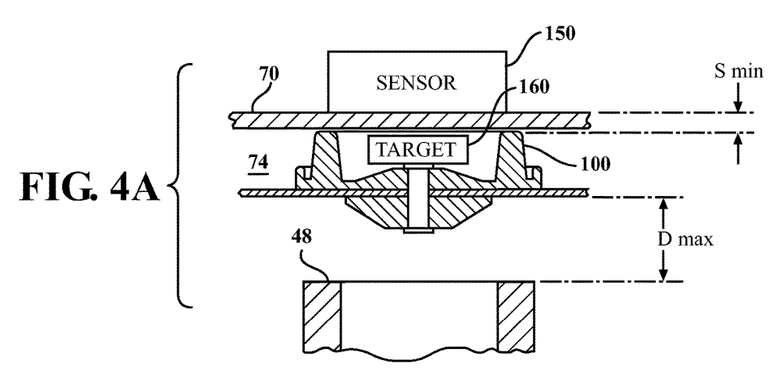
FIGS. 4A-4C are schematic illustrations depicting positional relationships between a sensor and a target, as well as between a pressure operated valve member and a valve seat when the pressure operated valve member is in a fully open position, a fully closed position, and an intermediate position.

In FIG. 4A, the pressure operated valve member 100 is disposed in a fully open position. In this position, a minimum distance $S_{min}$ is established between the position sensor 150 and the sensor target 160, for example, by virtue of engagement of the pressure operated valve member 100 with the cover 70. At the same time, a maximum distance $D_{max}$ is established between the pressure operated valve member 100 and the valve seat 48.

Figure 4B:
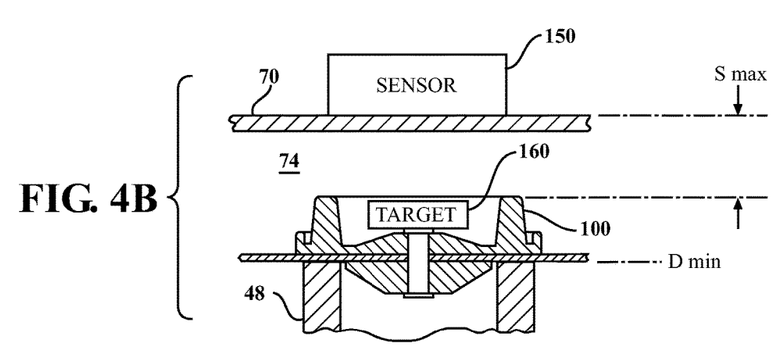

In FIG. 4B, the pressure operated valve member 100 is disposed in a fully closed position. A maximum distance $S_{max}$ is established between the position sensor 150 and the sensor target 160. At the same time, a minimum distance $D_{min}$, which is equal to zero, is established between the pressure operated valve member 100 and the valve seat 48, by virtue of engagement of the pressure operated valve member 100 with the valve seat 48 in the fully closed position of the pressure operated valve member 100.

Figure 4C:
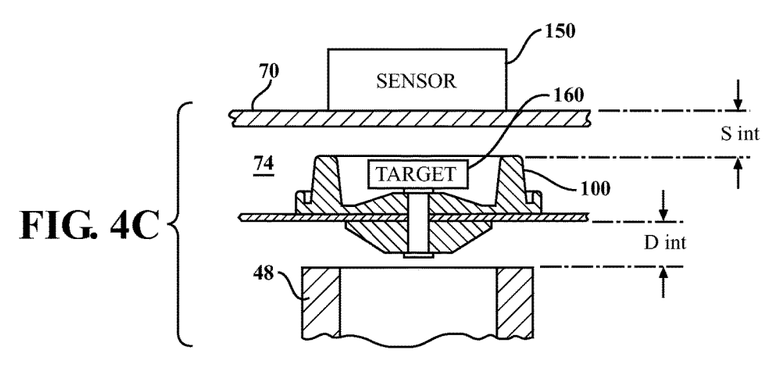

In FIG. 4C, the pressure operated valve member 100 is disposed in the intermediate position, which is a position at any point between the fully open position and the fully closed position. In this position, an intermediate distance $S_{int}$ is established between the position sensor 150 and the sensor target 160 while an intermediate distance $D_{int}$ is established between the pressure operated valve member 100 and the valve seat 48.

Figure 5:
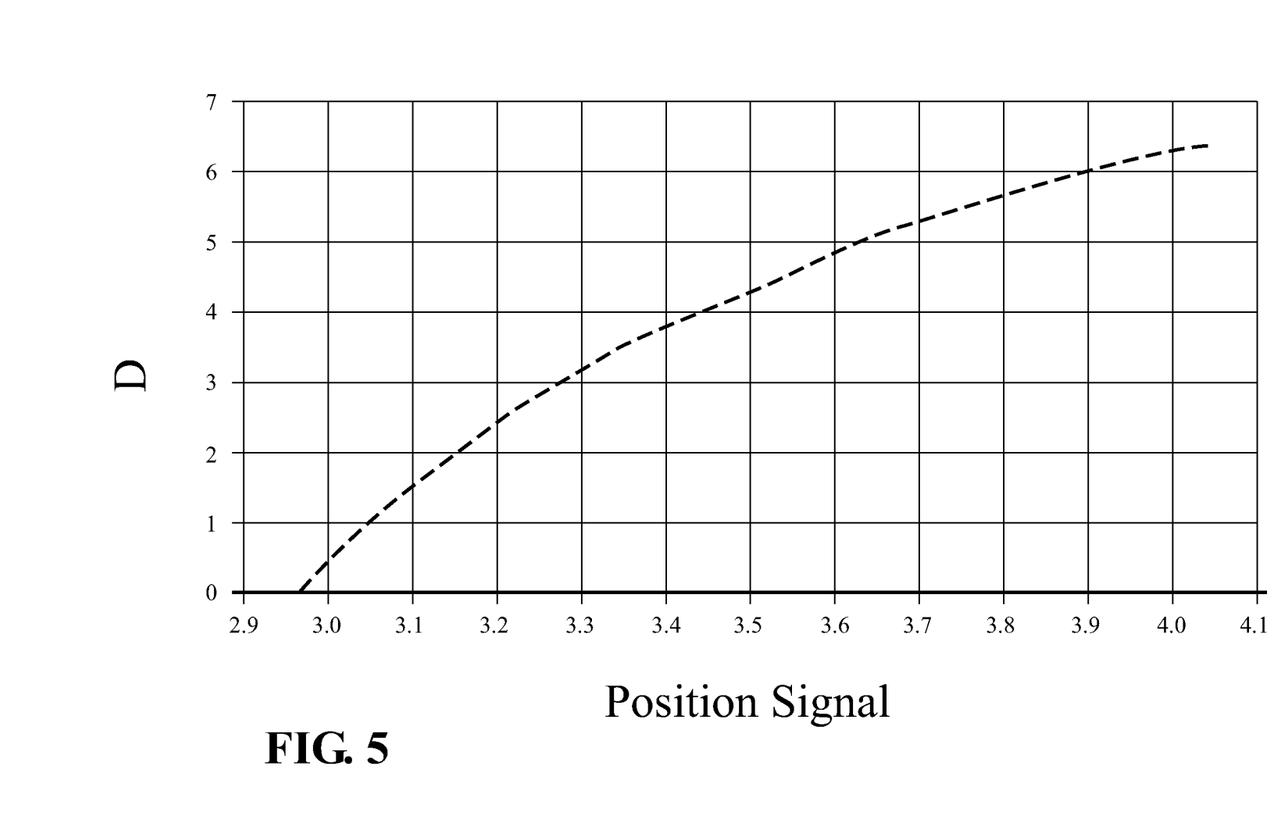
FIG. 5 is a graph showing a relationship between a position of the pressure operated valve member and a position signal.

In all of the positions described above, the position sensor 150 outputs the position signal in correspondence with the distance S between the position sensor 150 and the sensor target 160. In implementations where the position sensor 150 is a hall effect sensor that outputs a varying voltage value based on proximity of the sensor target 160, which in this example is a magnet, the position signal varies from a maximum voltage value when the pressure operated valve member 100 is in the fully open position to a minimum voltage value when the pressure operated valve member 100 is in the fully closed position. This relationship is shown in FIG. 5 in terms of a relationship between the distance D by which the pressure operated valve member 100 is spaced from the valve seat 48 relative to the position signal, which in this example is expressed as a voltage. This relationship can be used to calibrate the ECU 18 and thus set a desired position for the pressure operated valve member 100 based on the position signal.

By monitoring the position signal at the ECU 18, the position of the pressure operated valve member 100 can be regulated, which in turn regulates the flow rate of the liquid coolant 15 through the temperature control valve 10. As the position signal changes, the ECU 18 can modify its control of the electrically operated valve member 130 to regulate the pressure within the chamber 74, and thus change the position of the pressure operated valve member 100. By exercising this type of control on a continuing basis, the pressure operated valve member 100 can be maintained at a position that is intermediate of the fully open position and the fully closed position, as previously explained with respect to FIG. 4C.

As an example, the ECU 18 can first calculate a target temperature for the engine 12. The target temperature for the engine 12 can be set by the ECU based on the operating conditions of the engine 12, and thus, the operating temperature of the engine 12 can be varied to accommodate a wide range of conditions. As examples, the target temperature for the engine can be changed based on the type of fuel currently being used by the engine, the ambient temperature, the composition of the intake air, the composition of the exhaust gases produced by the engine 12, the amount of load placed on the engine 12, or any other suitable factor. The ECU 18 then compares the target temperature for the engine 12 with the current temperature of the engine 12, as sensed by the temperature sensor 22. A desired coolant flow rate is calculated by the ECU 18 by comparing the target temperature for the engine 12 to the current temperature of the engine 12, as represented by the temperature signal from the temperature sensor 22. As one example, the desired coolant flow rate can be based in part on a difference between the current temperature and the target temperature, such that the desired coolant flow rate is set to a higher value when the current temperature is much higher than the target temperature and the desired coolant flow rate is set to a lower value when the current temperature is close to the target temperature. As another example, the desired flow rate for the coolant can be set based in part on a rate of change of the temperature of the engine 12 as represented by the temperature signal from the temperature sensor 22. Thus, the ECU 18 can adjust the flow rate of the coolant to prevent temperature fluctuations, and to rapidly respond to changes of the operating condition of the engine. Furthermore, the desired flow rate for the coolant can be constantly adjusted by the ECU 18 based on changing conditions.

Based on the desired coolant flow rate, the ECU 18 selects a voltage range for the position signal that corresponds to a desired degree of opening (also referred to as a desired position or target position) of the pressure operated valve member 100. For example, the desired coolant flow rate can be related to the desired degree of opening (and the associated voltage value) for the pressure operated valve member 100 by an equation or by a lookup table. When the position signal increases above the selected range, the ECU 18 can close the electrically operated valve member 130 to increase the pressure in the chamber 74, thereby moving the pressure operated valve member 100 toward the closed position, which reduces the distance D. When the position signal falls below the selected range, the ECU 18 can open the electrically operated valve member 130 to decrease the pressure within the chamber 74, thereby allowing the pressure operated valve member to move toward the fully open position, thus increasing the distance D. A similar result can be achieved where the electrically operated valve member 130 is a fully proportional valve, where the degree of opening of the electrically operated valve member 130 is increased or decreased in response to the position signal.

Figure 6:
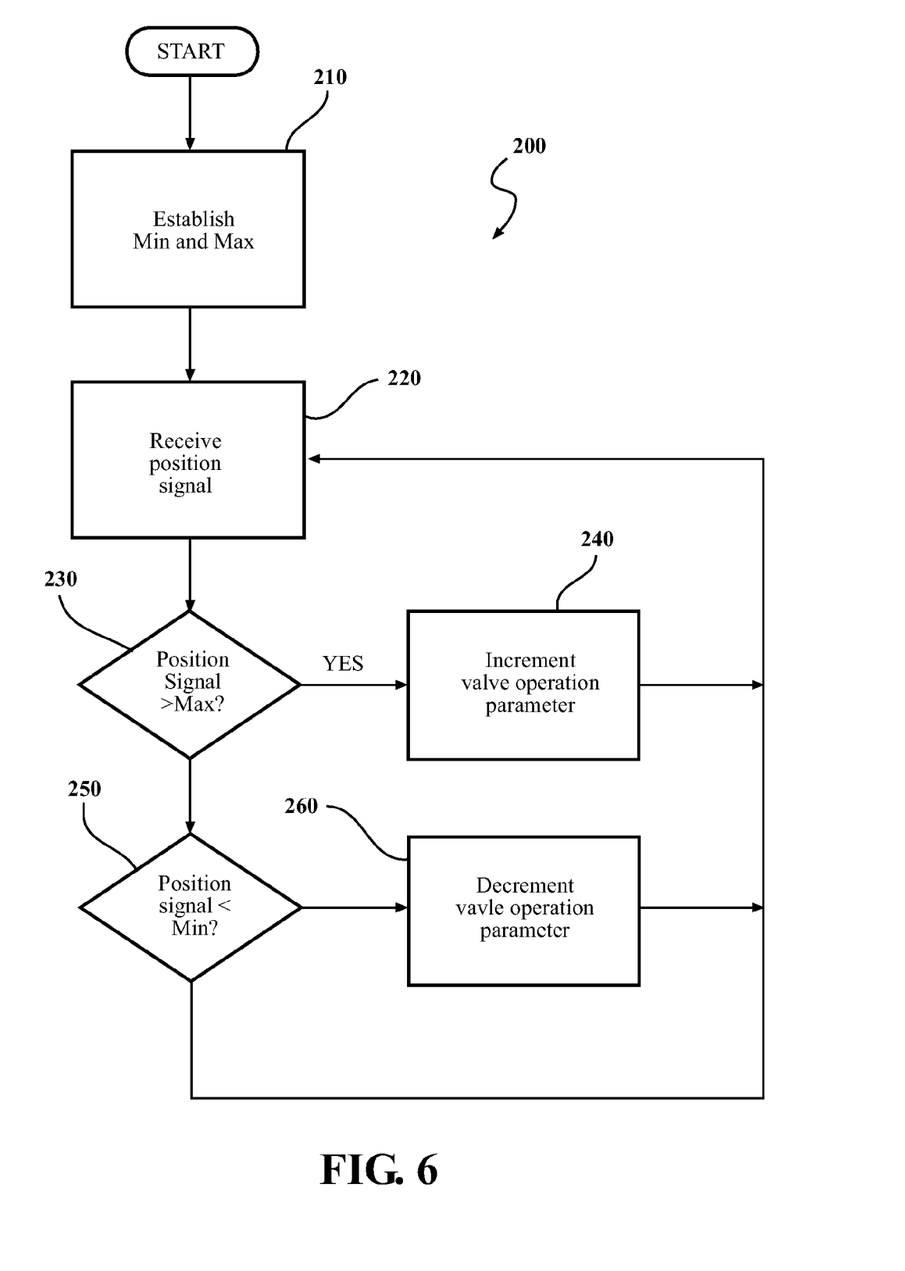
FIG. 6 is a flow chart showing an example of a method for controlling the temperature control valve.

FIG. 6 is a flow chart illustrating a method 200 for regulating operation of the temperature control valve 10. In one implementation, the method 200 can be embodied in solid state hardware as part of the ECU 18. In another implementation, the method 200 can be embodied as computer program instructions that are provided to the ECU 18 and are executed to perform the operations that will be described herein with respect to the method 200. The computer program instructions can be embodied in a non-transitory computer readable storage medium of any suitable type that can be accessed by the ECU 18 for execution.

Initially, in operation 210, minimum and maximum values for the position signal are selected by the ECU 18. The minimum and maximum values correspond to a target position for the pressure operated valve member and are selected based on a target flow rate for the liquid coolant 15. This selection can be made in part based on calibration information that is supplied to the ECU 18. The target flow rate for the liquid coolant is selected by the ECU 18 based in part on the temperature signal from the temperature sensor 22. At operation 220, the ECU 18 receives the position signal from the position sensor 150. The ECU 18 then compares the position signal to the minimum and maximum values that were selected in operation 210.

At operation 230, if the position signal is greater than the maximum value, a valve operation parameter by which the ECU 18 operates the electrically operated valve member 130 is incremented. As an example, the valve operation parameter can be a degree of restriction of the second flow path by the electrically operated valve member 130 or can be a ratio of the time that the electrically operated valve member 130 is closed during a given period of time. The method then returns to operation 220. Alternatively, if at operation 230, the position signal is less than the maximum value that was selected by the ECU 18, the method proceeds to operation 250.

At operation 250, a determination is made as to whether the position signal is less than the minimum value that was selected by the ECU 18. If the position signal is less than the minimum value, the method proceeds to operation 260, where the valve operation parameter is decremented, and the method then returns to operation 220. If, however, at operation 250, the position signal is greater than the minimum value, the method can return to operation 220 without modifying the valve operation parameter. In an alternative implementation, subsequent to operation 250 when the position signal is greater than the minimum value, the valve operation parameter could be changed to a neutral value, which is selected to maintain the pressure operated valve member 100 at the desired position.

In the foregoing example, the purpose of incrementing the valve operation parameter is to increase the pressure in the chamber 74, thereby placing the position of the pressure operated valve member 100 in the desired range by reducing the distance D and in turn reducing the magnitude of the position signal. The purpose of decrementing the valve operation parameter at operation 260 is to decrease the pressure in the chamber 74 until the position of the pressure operated valve member 100 is in the desired range by increasing the distance D, which in turn increases the magnitude of the position signal. It should be understood that the terms "increment" and "decrement" are relative to the valve operation parameter being controlled. In some implementations, the roles of incrementing and decrementing the valve operation parameter are reversed. Furthermore, the method 200 is explained by way of example only, and other control methods may be applied to regulate the position of the pressure operated valve member 100 and maintain it at a desired position in response to the position signal.

While the disclosure is directed to what is presently considered to be the most practical and preferred embodiment, it is to be understood that the invention is not to be limited to the disclosed embodiments, but to the contrary, it is intended to cover various modifications and equivalent arrangements.

What is claimed is:

1. A system for regulating a flow of a liquid coolant in an automotive cooling system for an engine, comprising:
   a valve body having an inlet and an outlet;
   a pressure operated valve member that moves within the valve body in response to a fluid pressure within a chamber adjacent to the pressure operated valve member to regulate a flow rate of the liquid coolant from the inlet to the outlet;
   an electrically operated valve member that is configured to regulate the fluid pressure within the chamber to thereby cause movement of the pressure operated valve member;
   a sensor target that is disposed within the valve body and is coupled to the pressure operated valve member for movement therewith;
   a position sensor that is located outside of the valve body and outputs a position signal based on proximity of the sensor target to the position sensor;
   a temperature sensor that outputs a temperature signal; and
   an electronic control unit that calculates a target temperature for the engine, calculates a target coolant flow rate based on the target temperature for the engine and the temperature signal, determines a minimum value and a maximum value for the position signal based on the target coolant flow rate, and controls operation of the electrically operated valve member based on the position signal being greater than the maximum value or less than the minimum value.

2. The system of claim 1, wherein the position signal changes in correspondence to a distance between the pressure operated valve member and a valve seat that is defined by the valve body.

3. The system of claim 1, wherein the sensor target is a magnet disposed within the chamber.

4. The system of claim 3, wherein the position sensor is a hall effect sensor.

5. The system of claim 1, wherein a position of the pressure operated valve member can be maintained in at least one intermediate position between a fully open position and a fully closed position, a target position being in the fully open position, the fully closed position, or the at least one intermediate position, and the electrically operated valve member is operated based on the position signal to maintain the pressure operated valve member at the target position.

6. The system of claim 5, wherein the position signal varies in relation to a distance between the position sensor and the sensor target.

7. The system of claim 1, wherein the pressure operated valve member regulates the flow rate of the liquid coolant from the inlet to the outlet by changing a degree of restriction along a first flow path from the inlet to the outlet.

8. The system of claim 7, wherein the electrically operated valve member regulates the fluid pressure within the chamber by changing a degree of restriction along a second flow path from the inlet to the outlet, wherein the second flow path includes the chamber.

9. The system of claim 8, wherein the electrically operated valve member is a nonproportional valve that is movable between a fully open position and a fully closed position along the second flow path to maintain a selected fluid pressure in the chamber.

10. The system of claim 8, wherein the electrically operated valve member is a proportional valve that is movable to an intermediate position between a fully open position and a fully closed position along the second flow path to maintain a selected fluid pressure in the chamber.

11. The system of claim 1, wherein the pressure operated valve member is a diaphragm valve.

12. The system of claim 1, wherein the electrically operated valve member is a solenoid valve.

13. The system of claim 1, wherein the electronic control unit calculates the target temperature based on at least one of ambient temperature, composition of intake air, composition of exhaust gases produced by the engine, or an amount of load placed on the engine.

* * * * *